United States Patent [19]

Igarashi et al.

[11] Patent Number: 4,499,252

[45] Date of Patent: Feb. 12, 1985

[54] PROCESS FOR PRODUCING POLYIMIDE PRECURSOR

[75] Inventors: Kazumasa Igarashi; Katsuhiko Yamaguchi; Munekazu Tanaka, all of Osaka, Japan

[73] Assignee: Nitto Electric Industrial Co., Ltd., Osaka, Japan

[21] Appl. No.: 594,063

[22] Filed: Mar. 28, 1984

[51] Int. Cl.³ .............................................. C08G 73/10
[52] U.S. Cl. ...................................... 528/38; 528/40; 528/41; 528/43; 528/125; 528/126; 528/128; 528/172; 528/185; 528/188; 528/189; 528/229; 528/352; 528/353
[58] Field of Search ....................... 528/38, 40, 41, 43, 528/125, 126, 128, 172, 185, 188, 189, 229, 352, 353

[56] References Cited

U.S. PATENT DOCUMENTS

| | | | |
|---|---|---|---|
| 3,576,031 | 4/1971 | Holub et al. | 528/41 |
| 3,926,911 | 12/1975 | Greber et al. | 528/38 |
| 3,950,308 | 4/1976 | Greber et al. | 528/38 |
| 4,200,724 | 4/1980 | Darms et al. | 528/38 |

*Primary Examiner*—Lester L. Lee
*Attorney, Agent, or Firm*—Sughrue, Mion, Zinn, Macpeak, and Seas

[57] ABSTRACT

A process for producing a polyimide precursor having excellent adhesion property and improved moisture resistance by polymerization of an organic tetracarboxylic acid component and a diamine is disclosed. A portion of the organic tetracarboxylic acid is reacted with an aminosilane compound in which H in an amino group is substituted with a monovalent organic group containing a hydrophobic aromatic ring, to produce a silane-modified polycarboxylic acid component and the resulting silane-modified polycarboxylic acid component is polymerized with a diamine together with the residual organic tetracarboxylic acid component.

12 Claims, 3 Drawing Figures

PROCESS FOR PRODUCING POLYIMIDE PRECURSOR

FIELD OF THE INVENTION

The present invention relates to a process for producing a polyimide precursor by polymerization reaction of an organic tetracarboxylic acid component and a diamine. More particularly, it relates to a process for producing a polyimide precursor having a good adhesion to an article to be adhered such a glasses, ceramics or silicone wafers and an improved moisture resistance.

BACKGROUND OF THE INVENTION

As represented by the uses of a surface protecting paint of an element for semiconductor device, a binder for die bonding adhesive, a cloth impregnated material, an organic film for orientation of a liquid crystal or a shielding film for preventing soft error of large scale integrated circuits, where a polyimide film is provided on the interface of an article wherein the surface is Si or Si—O—Si, the article has a poor adhesion to the polyimide polymer. Therefore, a method of treating the interface between the polyimide film and Si or Si—O—Si or a method of introducing an alkoxy group or siloxane group into the polyimide polymer has heretofore been employed to improve the adhesion.

Further, as the process which can provide good results as compared with the conventional techniques, a process has been proposed, which comprises reacting a portion of an organic tetracarboxylic acid component with an aminosilane compound represented by the formula (3)

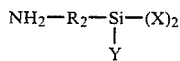

wherein $R_2$ is a divalent organic group containing a carbon atom which directly bonds to a silicon atom, X is a hydrolyzable group selected from alkoxy, acetoxy, phenoxy or halogen and Y is a group selected from alkyl, alkoxy, acetoxy, phenoxy, silyl, siloxy, disilanyl, organosilyl, organosiloxy, organohalosilyl or organohalosiloxy, through the amino group ($NH_2$—) and at least one hydrolyzable group (X) in the formula (3) to obtain a silane-modified polycarboxylic acid component represented by the formula (4)

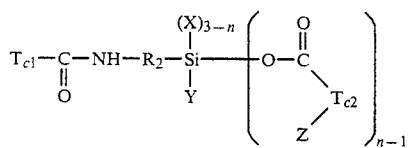

wherein $T_{c1}$ is a monovalent residue of the organic tetracarboxylic acid component, $T_{c2}$ is a divalent residue of the organic tetracarboxylic acid component, Z is an acid radical which may contain X which bonds to carbonyl carbon, $R_2$, X and Y are the same as defined in the formula (3), and n is an integer of 2 or 3 when Y is alkoxy, acetoxy or phenoxy and is an integer of 2 when Y is other groups, and polymerizing the resulting carboxylic acid component and a diamine together with the residual organic tetracarboxylic acid component.

The polyimide polymer produced by this process, however, showed excellent initial adhesion and also excellent adhesion under Pressure Cooker Test at 121° C. under 2 atoms (hereinafter referred to as "PCT"), but the problem occurred that the retention characteristic of the initial adhesive strength under high temperature and high humidity conditions gradually lowered. This lacked the reliability of devices in view of the recent severe requirement on the moisture resistance property.

SUMMARY OF THE INVENTION

Various investigations have been made to overcome the disadvantages in the conventional techniques and have led the present invention.

An object of the present invention is to provide a process for producing a polyimide precursor by using an aminosilane compound in which H in an amino group is substituted with a monovalent organic group containing a hydrophobic aromatic ring as represented by the formula (1)

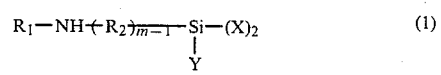

wherein $R_1$ is a monovalent organic group containing an aromatic ring, $R_2$ is a divalent organic group containing carbon atom which directly bonds to silicon atom, X is a hydrolyzable group selected from alkoxy, acetoxy, phenoxy or halogen, Y is a group selected from alkyl, alkoxy, acetoxy, phenoxy, silyl, siloxy, disilanyl, organosilyl, organosiloxy, organohalosilyl or organohalosiloxy, and m is an integer of 1 or 2, in place of the aminosilane compound of the formula (3), reacting a portion of an organic tetracarboxylic acid component with the aminosilane compound of the formula (1) through a secondary amino group (>NH) and at least one hydrolyzable group (X) in the formula (1) to prepare a silane-modified polycarboxylic acid component represented by the formula (2)

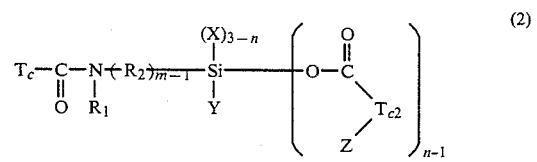

wherein $T_{c1}$ is a monovalent residue of the organic tetracarboxylic acid component, $T_{c2}$ is a divalent residue of the organic tetracarboxylic acid component, Z is an acid radical which may contain X bonded to carbonyl carbon, n is an integer of 2 or 3 when Y is alkoxy, acetoxy or phenoxy and is an integer of 2 when Y is other groups, and $R_1$, $R_2$, X and m are the same as defined above, and polymerizing the resulting carboxylic acid component and a diamine together with the residual organic tetracarboxylic acid component.

DETAILED DESCRIPTION OF THE INVENTION

Figure 1:
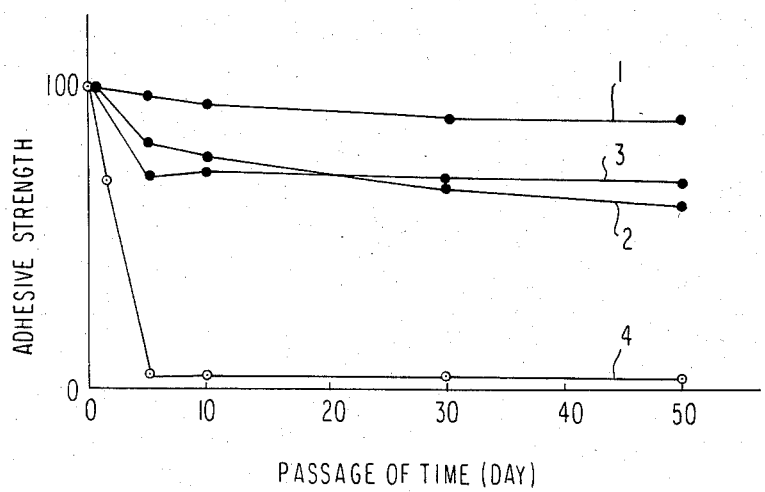
FIG. 1 is a graph showing the change of the adhesive strength with the passage of time of the polyimide films obtained according to the examples and comparative example.

According to the polyimide precursor obtained by the process of the present invention, the monovalent organic group ($R_1$) containing aromatic ring in the formula bonds to the polymer chain in the form of pendant, and due to this substituent effect and that the organic group ($R_1$) is bulky, a hydrophobicity with respect to water is developed and a polyimide polymer obtained by cyclization condensation of the precursor polymer similarly becomes hydrophobic, whereby an adhesive strength to an article to be adhered is remarkably improved.

Thus, according to the present invention, the aminosilane compound can be directly introduced into a polymer as the same as in the conventional process and the adhesion can be improved without a surface treatment as conventionally employed, e.g., an article to be adhered is previously treated with, for example, a coupling agent and then a polyimide film is formed to maintain the adhesive strength. In addition, since the hydrophobic and bulky aromatic ring is bonded to the polymer chain in the form of pendant, the adhesive strength between the article and the polymer coating is improved and as a result, the retention characteristic of the initial adhesive strength under high temperature and high humidity can be remarkably improved.

The improvement of the adhesive strength in the present invention can be achieved by the necessary and minimum amount of the aminosilane compound used for modification and introduction of the aminosilane compound does never deteriorate the moisture resistance of the polyimide polymer itself. Further, when finally heat treated at high temperature to convert to the polyimide, excellent adhesion and adhesive strength and also excellent heat resistance, resistance to chemicals, electrical insulating property, mechanical characteristics, etc. which are the inherent excellent properties of the polyimide are exhibited. Accordingly, it is not particularly required to further blend a conventional unmodified polyimide to the modified precursor. That is, a polyimide precursor exhibiting the above described excellent properties can be produced by a simple operation that various silane-modified polycarboxylic acid components of the formula (2) and the conventional organic tetracarboxylic acid component are simultaneously polymerized in the presence of a diamine. This is extremely advantageous on the production step and improves the uniformity of the polyimide.

The organic tetracarboxylic acid component used in the present invention has two pairs of two acid radicals, each pair of which bonds to the adjacent carbon atoms, i.e., has four acid radicals.

Examples of the organic tetracarboxylic acid component include aromatic, aliphatic or alicyclic tetracarboxylic acids or the derivatives thereof such as esters, amides, holides, monoanhydrides or dianhydrides. Most preferred example of the organic tetracarboxylic acid component is aromatic tetracarboxylic dianhydride. The acid component may be used alone or as the mixture thereof.

Although the representative examples of each example of the organic tetracarboxylic acid component are not particularly necessary to show, the representative examples of the aromatic tetracarboxylic dianhydride which is most preferred include pyromellitic dianhydride, 3,3',4,4'-benzophenonetetracarboxylic acid dianhydride, 3,3',4,4'-biphenyltetracarboxylic acid dianhydride, 2,3,3',4'-biphenyltetracarboxylic acid dianhydride, 2,3,6,7-naphthalenetetracarboxylic acid dianhydride, 1,2,5,6-naphthalenetetracarboxylic acid dianhydride, 1,4,5,8-naphthalenetetracarboxylic acid dianhydride, 2,2-bis(3,4-dicarboxyphenyl)propane dianhydride, bis(3,4-dicarboxyphenyl)sulfone dianhydride, 3,4,9,10-perylenetetracarboxylic acid dianhydride, bis(3,4-dicarboxyphenyl)ether dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)ethane dianhydride, benzene-1,2,3,4-tetracarboxylic acid dianhydride, 2,3,6,7-anthracenetetracarboxylic acid dianhydride, 1,2,7,8-phenanthrenetetracarboxylic acid dianhydride, etc.

The silane-modified polycarboxylic acid component represented by the formula (2) used in the present invention is prepared by modifying a portion of the organic tetracarboxylic acid with the aminosilane compound represented by the formula (1)

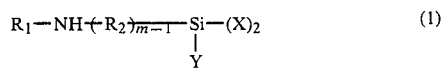

wherein $R_1$ is a monovalent organic group containing aromatic ring, $R_2$ is a divalent organic group containing carbon atom which directly bonds to silicon atom, m is an integer of 1 or 2, X is a hydrolyzable group selected from alkoxy, acetoxy, phenoxy or halogen and Y is a group selected from alkyl, alkoxy, acetoxy, phenoxy, silyl, siloxy, disilanyl, organosilyl, organosiloxy, organohalosilyl or organohalosiloxy.

Examples of the aminosilane compound include the compounds represented by the formulae

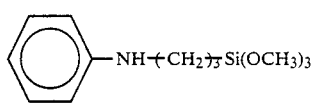

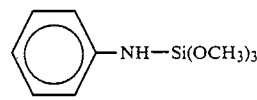

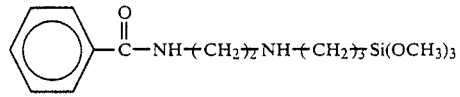

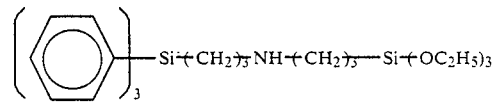

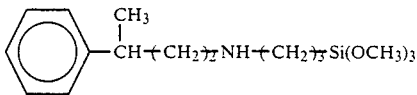

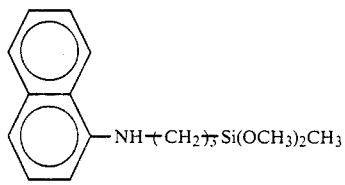

Other than the above, any compounds which can satisfy the formula (1) can of course be used.

The particularly preferred examples of the aminosilane compound are the compounds wherein m in the formula (1) is 2, i.e., the compounds having a divalent organic group ($R_2$) containing carbon atom which directly bonds to silicon atom. $R_2$ is not limited to only alkylene as shown in the above formulae and may be a group containing aromatic ring.

The modification is a reaction between an imine group, i.e., a secondary amino group (>NH), and at least one hydrolyzable group (X) in the formula (1) and the organic tetracarboxylic acid component. To achieve this reaction, about 2 to 3 moles, per mole of the aminosilane compound, of the organic tetracarboxylic acid component are used. The reaction generally proceeds exothermically. Therefore, the reaction is generally conducted in the presence of a polar solvent such as N-methyl-2-pyrrolidone or N,N'-dimethylacetamide while cooling the reaction vessel using a water bath to control the temperature at 30° C. or less until the reaction system becomes uniform and transparent.

The representative examples of the silane-modified polycarboxylic acid component obtained by this process wherein pyromellitic dianhydride is used as the organic tetracarboxylic acid component and ⟨benzene⟩—NH—CH₂CH₂CH₂—Si(OCH₃)₃ is used as the aminosilane compound, as shown by the following structural formula A wherein the symbols in the parentheses indicate each structural portion shown in the formula (2).

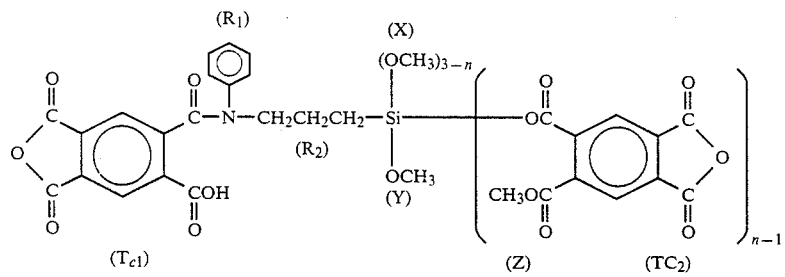

wherein n is an integer of 2 or 3.

In the above structural formula (A), about 3 moles, per mole of the aminosilane compound, of pyromellitic dianhydride is used to achieve n=3 and about 2 moles, per mole of the aminosilane compound, of pyromellitic dianhydride is used to achieve n=2. A mixture of the compound wherein n=2 and the compound wherein n=3 is obtained depending upon the moles of pyromellitic dianhydride used. However, such a mixture can be used in the present invention.

The above example is the case where the compound wherein Y in the formula (1) is alkoxy is used as the aminosilane compound. When the aminosilane compound wherein Y is a group other than alkoxy, acetoxy and phenoxy is used, about 2 moles, per mole of the aminosilane compound, of the organic tetracarboxylic acid component must be used to form the silane-modified polycarboxylic acid component wherein n in the formula (1) is 2. This remains at least one of alkoxy, acetoxy, halogen and phenoxy which directly bonds to silicon atom in the modified carboxylic acid component and as a result, the effect of remarkably improving the adhesion to a glass when such is converted to a polyimide polymer can be obtained.

Where the dianhydride is used as the organic tetracarboxylic acid component as in above embodiment, X(CH₃O in the structural formula (A)) which bonds to carbonyl carbon is contained in the Z structural portion of the formula (2). On the other hand, where a compound other than the dianhydride, such as a compound containing four free carboxyl groups or the compound wherein a portion or a whole of the four free carboxyl groups is esterified, amidated or hologenated, is used as the organic tetracarboxylic acid component, the Z structural portion of the formula (2) is generally constructed by the acid radical and in some cases, is constructed by bonding upon reaction the acid radical and X which had undergone an elimination reaction as in the case of the dianhydride.

In each embodiment, when a small amount of water is present in the system in the case where the Z structural portion is the acid radical other than free carboxyl group, the portion may ultimately be converted to a carboxyl group.

The silane-modified polycarboxylic acid component thus prepared and the residual unmodified organic tetracarboxylic acid component are simultaneously polymerized with the diamine to produce a polyimide precursor. Regarding the proportions of the acid component and diamine used, it is preferred that the amount of the diamine is equivalent to the total amount of the silane-modified tetracarboxylic acid component and unmodified organic tetracarboxylic acid component. However, several % excess acid component (the total amount) to the diamine is possible in the present invention.

The silane-modified polycarboxylic acid component which is one of the acid components is used in an amount such that the amount of the aminosilane compound used for the preparation of the silane-modified polycarboxylic acid component is 0.05 to 10 mol%, preferably 0.3 to 2.0 mole%, per the total mols of all the starting materials of the aminosilane compound, organic tetracarboxylic acid component, unmodified organic tetracarboxylic acid and diamine. According to the present invention, a sufficiently satisfactory adhesion property improvement effect to, for example, a glass can be obtained even if the amount of the aminosilane compound used is small as described above. On the other hand, if the amount of the aminosilane compound is too excess, the properties of film (i.e., tensile strength or toughness when a film is formed) or electrical properties such as dielectric breakdown voltage of the polyimide finally formed deteriorate. This is due to that the silane-modified polycarboxylic acid represented by the formula (2) having poor mechanical characteristics is introduced to the film of the unmodified polyimide skeleton.

As the diamine used for the polymerization, any of an aromatic diamine, aliphatic diamine and alicyclic diamine can be used. The aromatic diamine is preferably used to exhibit more excellent heat resistance. The diamine can be used alone or as the mixtures thereof.

Examples of the diamine are not particularly required to show. However, the representatives examples of the aromatic diamine which are preferably used include m-phenylene diamine, p-phenylene diamine, 4,4'-diaminodiphenyl methane, 4,4'-diaminodiphenyl ether, 2,2'-bis(4-aminophenyl) propane, 3,3'-diaminodiphenyl sulfone, 4,4'-diaminodiphenyl sulfone, 4,4'-diaminodiphenyl sulfide, benzidine, benzidine-3,3'-dicarboxylic acid, benzidine-3,3'-disulfonic acid, benzidine-3-monocarboxylic acid, benzidine-3-monosulfonic acid, 3,3'-dimethoxybenzidine, p-bis(4-aminophenyl) benzene, m-bis(4-aminophenoxy) benzene, m-xylene diamine and p-xylene diamine.

The polymerization reaction is conducted according to the conventional manners. In general, reaction is continued in the presence of a catalyst until a polymer having a high degree of polymerization is obtained property and a moisture absorbed therein causes lowering of molecular weight during polymerization and deterioration of storage stability of the polymer. Therefore, it is preferred that moisture contained in the solvent is sufficiently removed with a dehydrating agent prior to the use thereof.

Conventional solvent such as toluene, xylene, benzonitrile, benzene or phenol can be used together but the amount thereof should be within the range which does not decrease the solubility of the polyimide precursor produced.

The polyimide precursor according to the present invention thus obtained has the structure such that a polymer structure portion comprising the unmodified organic tetracarboxylic acid component and a polymer structure portion comprising the silane-modified polycarboxylic acid component are bonded in the specified proportion as shown by the structural formula B or the polymer structure such that the unmodified organic tetracarboxylic acid component and silane-modified polycarboxylic acid component are randomly copolymerized with the diamine. Thus, the polyimide precursor according to the present invention has a silane bond in the molecular chain skeleton. Further, total components of the modified polyimide precursor may contain a polyimide precursor comprising the unmodified organic tetracarboxylic acid or silane-modified polycarboxylic acid alone.

The structural formula B shown below is the example of the polyimide precursor in the case where pyromellitic dianhydride is used as the organic tetracarboxylic acid component, 4,4'-diaminodiphenyl ether is used as the diamine and the structural formula A shown before (wherein n is 2) is used as the silane-modified polycarboxylic acid component which is prepared by modifying the tetracarboxylic acid component with the aminosilane compound.

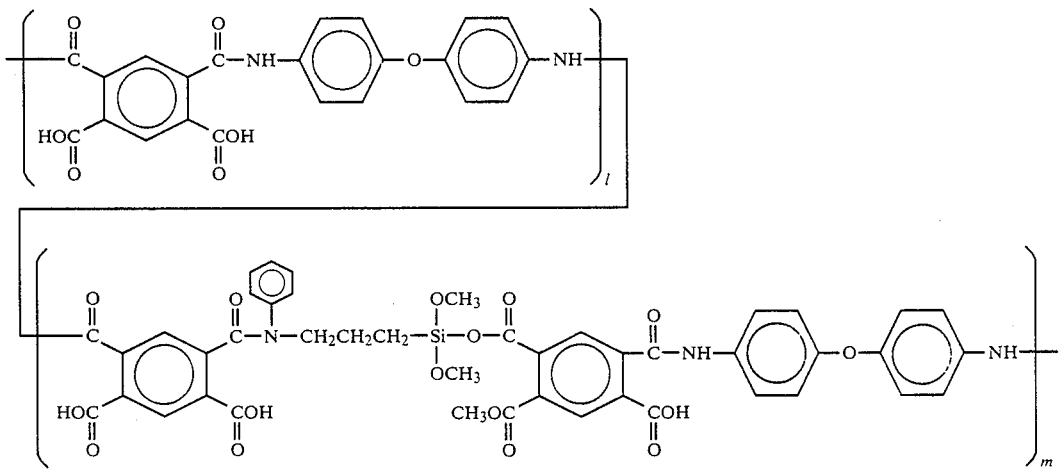

(wherein l and m each is an integer)

while controlling the temperature to 60° C. or less, preferably 30° C. or less, in view of a heat generated by polymerization. The degree of polymerization can be easily determined by measuring an inherent viscosity ($\eta$) of the reaction product.

The organic solvent used is a high polar basic solvent and the examples thereof are N-methyl-2-pyrrolidone, N,N'-dimethylacetamide N,N'-dimethylformamide, N,N'-dimethylsulfoxide and hexamethylphosphoramide. The solvent of this type has a large hygroscopic When the polyimide precursor is applied to an article and then heat treated at high temperature, the precursor can be converted into a polyimide having excellent adhesion property even if the article is various glasses, ceramics or silicone wafers, and since an aromatic ring is bonded to a polymer chain in a silane-modified portion in the form of pendant, a good hydrophobicity can be imparted to the polyimide polymer, whereby retention of the initial adhesive strength under various environmental conditions can be improved.

Thus, the polyimide precursor obtained according to the process of the present invention can be applied to various conventional uses and also can be effectively utilized as coating materials for, e.g., various glasses, ceramics or silicone wafers.

For example, an embodiment of using the polyimide precursor obtained according to the present invention as an organic film for orientation of a liquid crystal is explained as the representative example below.

A 1 to 15 wt% solution of the polyimide precursor is coated on the electrode formed surface of a substrate (e.g., glass plate) and heated at 150° to 350° C. for 5 to 300 hours to perform imide cyclization thereby forming a polyimide film having a thickness of 500 to 2,000 Å. The surface of the resulting polyimide film was then rubbed.

Figure 2:
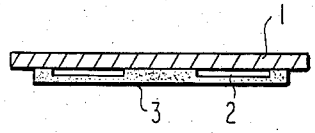
FIG. 2 shows one use embodiment (liquid crystal substrate of the polyimide film of the present invention.

The product thus obtained is called a liquid crystal substrate as shown in FIG. 2, wherein (1) is a substrate such as a glass plate, (2) is a (transparent) electrode composed of, for example, indium oxide and tin oxide, and (3) is an imidation product of the polyimide precursor, i.e., an organic film for orientation of a liquid crystal (polyimide film).

Figure 3:
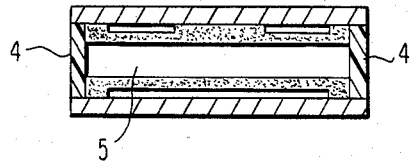
FIG. 3 shows a liquid crystal cell using the liquid crystal substrate.

FIG. 3 shows an example of liquid crystal cells obtained using the above liquid crystal substrate, wherein (4) is a resin seal composed of, for example, an epoxy resin, (5) is a liquid crystal composition such as a Schiff type liquid crystal, a biphenyl type liquid crystal, a cyclohexane type liquid crystal or an ester type liquid crystal.

The present invention will be now described in greater detail by reference to the following examples. In the examples, the inherent viscosity is employed as a parameter showing a degree of polymerization (molecular weight) of the polyimide precursor and is calculated by the following equation at a temperature of 30±0.01° C. (in a constant temperature bath) using N-methyl-2-pyrrolidone as a solvent.

$[\eta] = \ln (t/t_o)/C$ wherein
t: Falling time of the polymer solution measured in Ubbellohde viscometer,
$t_o$: Falling time of the solvent measured in Ubbellohde viscometer, P1 C: Concentration (0.5 wt%) of polyimide precursor (polymer).

EXAMPLE 1

A 500 ml flask equipped with a stirrer, condenser, thermometer and nitrogen inlet was placed on a water bath. 289.3 g of N-methyl-2-pyrrolidone which had been dried overnight with phosphorus pentoxide and further distilled under reduced pressure was added to the flask and nitrogen was then introduced into the flask 0.766 g (0.003 mol) of

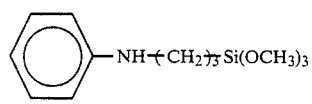

was added to the flask and 1.764 g (0.006 mol) of 3,3',4,4'-biphenyltetracarboxylic dianhydride was gradually added thereto. The temperature in the flask was controlled to 30° C. or less by the water bath. Reaction was conducted until the reaction system became transparent to obtain a silane-modified polycarboxylic acid component.

To the reaction system, 20.0 g (0.1 mol) of 4,4'-diaminodiphenyl ether was added to completely dissolve therein and 28.518 g (0.097 mol) of 3,3',4,4'-biphenyltetracarboxylic acid dianhydride was then added thereto and stirred until the reaction system became a transparent viscous solution. During this operation, the temperature was increased but the temperature was kept at 30° C. or less by the water bath.

The polyimide precursor thus obtained had an inherent viscosity of 1.75.

The polyimide precursor solution was cast onto a glass plate and heated at 150° C. for 1 hour, 200° C. for 1 hour and 250° C. for 6 hours in a hot-air dryer to convert the precursor into a polyimide. The polyimide film thus obtained was tough and did not peel away from the plate under the tests at room temperature and also PCT. Thus, the film had a good adhesion property.

For the sake of comparison, an polyimide precursor solution was prepared in the same manner as above except that the amount of

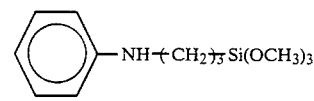

was changed 0.03 mol, the amount of 3,3',4,4'-biphenyltetracarboxylic acid dianhydride was changed 0.06 mol and the amount of unmodified 3,3',4,4'-biphenyltetracarboxylic acid dianhydride which was reacted with the diamine together with the modified polycarboxylic acid component was changed 0.07 mol. The polyimide precursor thus obtained had an inherent viscosity of 0.39.

Using this precursor solution, a polyimide film was formed in the same manner as above. The film had a good adhesion property under normal condition and PCT. However, since the degree of polymerization of the polyimide precursor was too low, the film-forming ability and toughness of the film were poor, microcracks occurred on the film and the dielectric breakdown voltage decreased to about 1/5 that of Example 1.

EXAMPLE 2

To the same flask as used in Example 1, 244.91 g of purified N-methyl-2-pyrrolidone was added, 0.766 g (0.003 mol) of the same aminosilane compound as used in Example 1 was added under nitrogen stream and 1.308 g (0.006 mol) of pyromellitic dianhydride was then gradually added. The reaction system was stirred until becoming a transparent solution while controlling the temperature to 30° C. or less to prepare a silane-modified polycarboxylic acid component.

To the reaction system, 20.0 g (0.1 mol) of 4,4'-diaminodiphenyl ether was added and 21.146 g (0.097 mol) of pyromellitic dianhydride was then added. The system was stirred until becoming a transparent viscous solution while maintaining the temperature at 30° C. or less.

The polyimide precursor thus obtained had an inherent viscosity of 1.51. The polyimide precursor solution was cast onto a glass plate and heated at 150° C. for 1 hour, 200° C. for 1 hour and 300° C. for 1 hour in a hot-air dryer to convert the precursor into a polyimide.

11

The polyimide film thus obtained was tough, had a good adhesion property under normal conditions and also PCT and did not peel away from the plate.

EXAMPLE 3

A polyimide precursor was prepared in the same manner as in Example 2 except that 0.496 g (0.003 mol) of

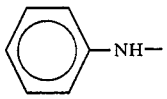

Si(OCH$_3$)$_3$ was used in place of

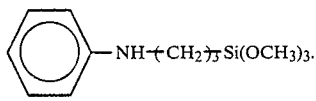

The precursor thus obtained had an inherent viscosity of 1.63. Using this precursor solution, a polyimide film was formed in the same manner as in Example 2 above. The film had the toughness and adhesion property comparable to those of the coating obtained in Example 2.

COMPARATIVE EXAMPLE 1

To the same flask as used in Example 1, 279.93 g of purified N-methyl-2-pyrrolidone was added and 20.0 g (0.1 mol) of 4,4'-diaminodiphenyl ether and 29.4 g (0.1 mol) of 3,3',4,4'-biphenyltetracarboxylic dianhydride were gradually added. The reaction system was stirred until becoming a transparent viscus solution. The temperature of the reaction system was controlled to 30° C. or less by cooling with the water bath. The polyimide precursor after reaction had an inherent viscosity of 2.00.

Using this precursor solution, a polyimide film was formed on a glass plate under the same conditions as in Example 1. The film was tough and had a good flexibility. However, the film was merely weakly adhered to the glass plate under normal conditions (the film tends to easily peel away) and was completely peeled away under PCT.

COMPARATIVE EXAMPLE 2

A polyimide precursor was prepared in the same manner as in Example 1 except that 0.663 g (0.003 mol) of NH$_2$—(CH$_2$)$_3$—Si(OCH$_3$)$_3$ was used in place of

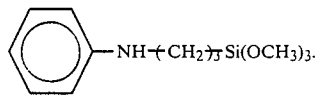

The precursor thus obtained had an inherent viscosity of 1.58.

Using this precursor solution, a polyimide film was formed in the same manner as in Example 1. The film had excellent adhesion property and toughness as same as in Example 1. However, regarding the adhesive strength of the film with the passage of time under high temperature and high humidity (85° C., 85% RH), good results could not be obtained as shown by Curve 4 in FIG. 1.

According to Examples 1 to 3 of the present invention, as shown by Curve 1 (Example 1), Curve 2 (Example 2) and Curve 3 (Example 3) in FIG. 1, bulky and hydrophobic aromatic rings are bonded with respect to the polymer chain in the form of pendant due to the aminosilane compound used and as a result, good results can be obtained in the retention characteristic of adhesive strength.

While the invention has been described in detail and with reference to specific embodiments thereof, it will be apparent to one skilled in the art that various changes and modifications can be made therein without departing from the spirit and scope thereof.

What is claimed is:

1. A process for producing a polyimide precursor by polymerizing an organic tetracarboxylic acid component and a diamine, which comprises reacting a portion of an organic tetracarboxylic acid component with an aminosilane compound represented by the formula (1)

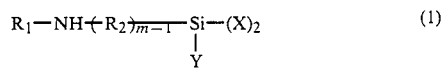

wherein R$_1$ is a monovalent organic group containing an aromatic ring, R$_2$ is a divalent organic group containing a carbon atom which directly bonds to a silicone atom, m is an integer of 1 or 2, X is a hydrolyzable group selected from the group consisting of alkoxy, acetoxy, phenoxy and halogen, and Y is a group selected from the group consisting of alkyl, alkoxy, acetoxy, phenoxy, silyl, siloxy, disilanyl, organosilyl, organosiloxy, organohalosilyl and organohalosiloxy, through a secondary amino group (>NH) and at least one hydrolyzable group (X) in the above formula (1) to prepare a silane-modified polycarboxylic acid component represented by the formula (2)

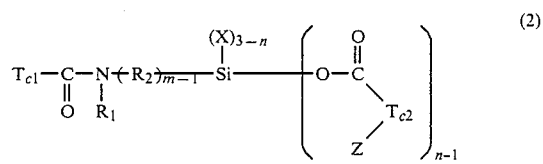

wherein T$_{c1}$ is a monovalent residue of the organic tetracarboxylic acid component, T$_{c2}$ is a divalent residue of the organic tetracarboxylic acid component, Z is an acid radical which may contain X bonded to carbonyl carbon, R$_1$, R$_2$, m, X and Y are the same as defined above, and n is an integer of 2 or 3 when Y is alkoxy, acetoxy or phenoxy and is 2 when Y is a group other than alkoxy, acetoxy and phenoxy, and then polymerizing the resulting silane-modified polycarboxylic acid component with the residual organic tetracarboxylic acid component and a diamine.

2. A process as claimed in claim 1, wherein the organic tetracarboxylic acid is an aromatic tetracarboxylic dianhydride.

3. A process as claimed in claim 2, wherein the organic tetracarboxylic dianhydride is selected from the group consisting of pyromellitic dianhydride, 3,3',4,4'-benzophenonetetracarboxylic acid dianhydride, 3,3',4,4'-biphenyltetracarboxylic acid dianhydride, 2,3,3',4'-biphenyltetracarboxylic acid dianhydride, 2,3,6,7-naphthalene-tetracarboxylic acid dianhydride, 1,2,5,6-naphthalenetetracarboxylic acid dianhydride, 1,4,5,8-naphthalenetetracarboxylic acid dianhydride, 2,2-bis(3,4-dicarboxyphenyl)-propane dianhydride, bis(3,4-dicarboxyphenyl)sulfone dianhydride, 3,4,9,10-perylenetetracarboxylic acid dianhydride, bis(3,4-dicarboxyphenyl)ether dianhydride, 2,2-bis(2,3-dicarboxyphenyl)propane dianhydride, 1,1-bis(2,3-dicarboxyphenyl)ethane dianhydride, 1,1-bis(3,4-dicarboxyphenyl)-ethane dianhydride, benzene-1,2,3,4-tetracarboxylic acid dianhydride, 2,3,6,7-anthracenetetracarboxylic acid dianhydride and 1,2,7,8-phenanthrenetetracarboxylic acid dianhydride.

4. A process as claimed in claim 1, wherein the aminosilane compound is selected from the group consisting of

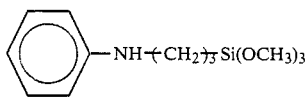

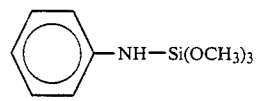

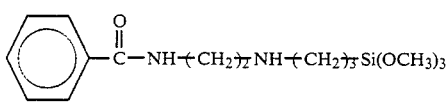

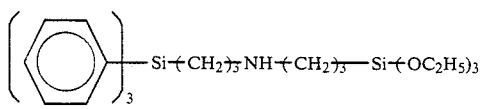

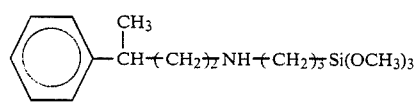

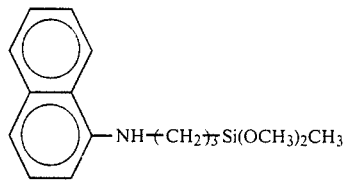

5. A process as claimed in claim 1, wherein the amount of the organic tetracarboxylic acid used for reacting with the aminosilane compound is about 2 to 3 mols per mol of the aminosilane compound.

6. A process as claimed in claim 1, wherein the reaction is conducted at 30° C. or less in the presence of a polar solvent.

7. A process as claimed in claim 1, wherein the diamine is selected from the group consisting of an aromatic diamine, an aliphatic diamine and an alicyclic diamine.

8. A process as claimed in claim 7, wherein the aromatic diamine is selected from the group consisting of m-phenylene diamine, p-phenylene diamine, 4,4'-diaminodiphenyl methane, 4,4'-diaminodiphenyl ether, 2,2'-bis(4-aminophenyl) propane, 3,3'-diaminodiphenyl sulfone, 4,4'-diaminodiphenyl sulfone, 4,4'-diaminodiphenyl sulfide, benzidine, benzidine-3,3'-dicarboxylic acid, benzidine-3,3'-disulfonic acid, benzidine-3-monocarboxylic acid, benzidine-3-monosulfonic acid, 3,3'-dimethoxybenzidine, p-bis(4-aminophenyl) benzene, m-bis(4-aminophenoxy) benzene, m-xylene diamine and p-xylene diamine.

9. A process as claimed in claim 1, wherein the amount of the diamine is equivalent to the total amount of the silane-modified polycarboxylic acid component and the unmodified organic tetracarboxylic acid component.

10. A process as claimed in claim 1, wherein the silane-modified polycarboxylic acid component is used in an amount such that the amount of the aminosilane compound is 0.05 to 10 mol% per the total mols of all the starting materials of the aminosilane compound, organic tetracarboxylic acid, unmodified organic tetracarboxylic acid and diamine.

11. A process as claimed in claim 1, wherein the polymerization is conducted at 60° C. or less in the presence of an organic solvent.

12. A process as claimed in claim 11, wherein the organic solvent is selected from the group consisting of N-methyl-2-pyrrolidone, N,N'-dimethylacetamide, N,N'-dimethylformamide, N,N'-dimethylsulfoxide and hexamethylphosphoramide.

* * * * *